United States Patent
Barquet et al.

[11] Patent Number: 5,860,621
[45] Date of Patent: Jan. 19, 1999

[54] HELICOPTER LANDING GEAR WITH SKIDS

[75] Inventors: Henri Fernand Louis Barquet, Les Martigues; Pierre Prudhomme Lacroix; Joseph Francois Robert Mairou, both of Vitrolles, all of France

[73] Assignee: Eurocopter France, France

[21] Appl. No.: 871,404

[22] Filed: Jun. 9, 1997

[30] Foreign Application Priority Data

Jun. 10, 1996 [FR] France .................................. 96-07156

[51] Int. Cl.⁶ ................................................ B04C 25/06
[52] U.S. Cl. ........................................ 244/17.17; 244/108
[58] Field of Search .......................... 244/100 R, 103 R, 244/104 R, 108, 109

[56] References Cited

U.S. PATENT DOCUMENTS

| | | | |
|---|---|---|---|
| 1,450,424 | 4/1923 | Beebe . | |
| 3,193,221 | 7/1965 | Victorian | 244/17.17 |
| 4,270,711 | 6/1981 | Cresap et al. | 244/17.17 |
| 5,211,359 | 5/1993 | Rene et al. | 244/17.17 |
| 5,224,669 | 7/1993 | Guimbal | 244/17.17 |

FOREIGN PATENT DOCUMENTS

| | | |
|---|---|---|
| 0 143 690 A | 6/1985 | European Pat. Off. . |
| 2 638 707 A | 5/1990 | France . |
| WO 95/12522 A | 3/1995 | WIPO . |

*Primary Examiner*—Galen L. Barefoot
*Attorney, Agent, or Firm*—Henderson & Sturm

[57] ABSTRACT

Helicopter landing gear, comprising two skids P each having a longitudinal support stretch 1 for standing on the ground and which are connected to a front cross-piece and a rear cross-piece 2 which are themselves attached to the structure of the aircraft by connecting devices 4, 6, the rear cross-piece 2 being fixed by the ends of its descending branches 2a to the rear part of the said longitudinal support stretches 1. Each of the said skids P has at the front an inclined transition zone T with double curvature C1, C2 orienting itself transversely with respect to the said longitudinal support stretches which stand on the ground, above the plane of the latter, the two transition zones together constituting in this way an integrated front cross-piece offset with respect to the front delimitation of the plane of contact of the said longitudinal support stretches of the skids on the ground.

Application to light helicopters.

16 Claims, 5 Drawing Sheets

FIG.4a.
FIG.4b.
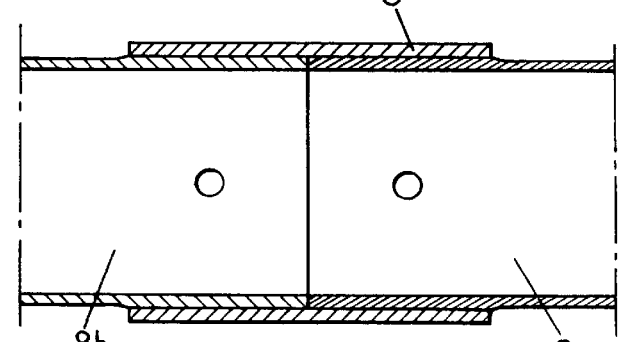
FIG.5.
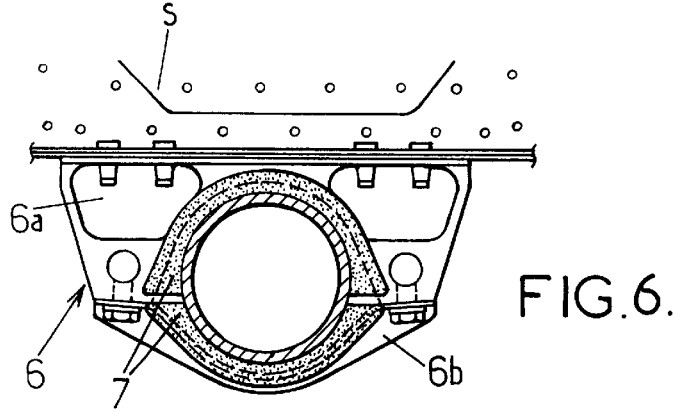
FIG.6.

HELICOPTER LANDING GEAR WITH SKIDS

BACKGROUND OF THE INVENTION

1. Field of the Invention

The present invention relates to helicopter landing gear, more particularly intended for light helicopters, comprising two skids each having a longitudinal support stretch for standing on the ground and which are connected to a front cross-piece and a rear cross-piece which are themselves attached to the structure of the aircraft by connecting devices, the rear cross-piece being fixed by the ends of its descending branches to the rear part of the said longitudinal support stretches.

2. Description of the Prior Art

Conventionally, landing gears with skids principally comprise four elements: two cross-pieces connected to the airframe at the top and two skids for contact with the ground connected to the bottom parts of the cross-pieces. Such conventional landing gears are described for example in the document U.S. Pat. No. 2,641,423 and in the document FR 1 578 594.

On landing, the impact energy is absorbed by elastic deformation and then by plastic deformation of the cross-pieces, essentially by working in a flexion mode. In general, the cross-pieces are made of steel tubes and the skids are made of aluminium tubes. The major disadvantage of this concept is the great rigidity of the system, which results in high acceleration factors during landings, difficult frequency adaptation, with respect to the phenomenon known as "ground resonance", and a rather high landing gear weight.

The purpose of the present invention is to overcome these disadvantages of the prior art and to obtain helicopter landing gear with a new design making it possible to reduce the said disadvantages significantly:

approximately 20% reduction in mass, simplification of the manufacturing and approximately 10% cost reduction, approximately 10% reduction in the load factor on landing, elimination of mechanical anti-ground resonance systems.

For this purpose, landing gear according to the invention, of the type defined at the beginning, is characterized in that each of the said skids has at the front an inclined transition zone with double curvature orienting itself transversely with respect to the said longitudinal support stretches which stand on the ground, above the plane of the latter, the two transition zones together constituting in this way an integrated front cross-piece offset either forwards or backwards with respect to the front delimitation of the plane of contact of the said longitudinal support stretches of the skids on the ground.

The rear part of this landing gear will have the actual function of skids: on landing, it will come into contact with the ground and principally will transmit the differential torsion between the front elements and the rear of the landing gear. The front cross-piece, which is thus integrated with the "skid" section, will contribute to the overall energy balance and will have, thanks to the flexion of the said transition zones, a predominant function of absorption of the forces generated during hard and sliding landings: it will prevent the complete collapse of the landing gear towards the rear when the sliding speeds are very high. It is understood that the general shape of this integrated front cross-piece, which is situated such that it protrudes in front of the skids or such that it is offset backwards, results principally from bendings of the tubes, in two different planes, on both sides of the landing gear (right and left).

The ground resonance behaviour is characterized in particular by the landing gear's roll stiffness. As the landing gear is fixed to the structure, for example by means of a single rear point and two front points, the torsional stiffness with respect to the pitch axis is principally obtained by the flexion of the front cross-piece. The variant according to which the points at which the front cross-piece stands on the ground are offset longitudinally towards the front of the aircraft with respect to the points of attachment to the structure of the latter has the advantage of allowing the roll functioning of the assembly to cause the front cross-piece to work both in torsion and in flexion instead of in pure flexion. A reduced roll stiffness results from this, which improves the ground resonance behaviour of the helicopter in the roll mode and this avoids any divergent phenomenon which would risk causing an accident.

According to another important characteristic of the invention, the assembly of skids and cross-pieces is constituted by aluminium tubes, this aluminium being characterized by an elastic limit of about 75% of the fracture strength and by a relative elongation at fracture at least equal to 12%.

Also, advantageously, the wall thickness of the tubes constituting the said front and rear cross-pieces is degressive between the central section of the cross-piece and its junction with the corresponding skid.

These various compromises make it possible to meet the size requirements of the landing gear and to satisfy the following three criteria:

absorption of energy corresponding to normal vertical impact speeds, critical landing speed resulting in residual deformation situated outside of the normal operating range, and sufficient flexibility to avoid the use of an additional anti-resonance system.

BRIEF SUMMARY OF THE INVENTION

The rear cross-piece can be connected in a conventional manner to the rear section of the longitudinal support stretches. In this way it will be possible to provide for the ends of the descending branches of the rear cross-piece to be fixed to the said longitudinal support stretches of the skids by the intermediary of aluminium coupling pieces.

The integrated front cross-piece, like the rear cross-piece, with their devices for connection with the structure of the aircraft, can be embodied according to different variants.

It will thus be possible for landing gear according to the invention to be characterized in that the said front cross-piece consists of two half-branches connected to one another near the middle of the cross-piece by a removable junction means establishing the continuity of the cross-piece in flexion.

As a variant, it will however be possible to provide for the said front cross-piece to consist of a single branch whose ends are each connected by a removable junction means to the front part of the corresponding skid, this junction means being disposed between the two curves of the transition zone in question.

In both cases it will be possible to use junction means consisting of a screwed coupling piece system, made of aluminium, or of an attachment collar, or the junction can be made by gluing or by welding when the possibility of dismantling is not required.

With regard to the connecting devices between the said front and rear cross-pieces and the structure of the aircraft, it will be possible for them to be of the type with controlled friction in rotation, comprising for this purpose two half-collars or similar devices clamping the tube of the cross-piece, with the interposition of a bearing made of elastic material of the elastomer type. In fact, one of the characteristics of the invention is the fact that there is a relative movement of rotation between the front cross-pieces and the structure during the normal functioning of the landing gear. This movement can be used for introducing possible shock absorbing.

These connecting devices will thus have flexibility making it possible to reduce the local stresses and moments due to large deformations, by allowing a degree of freedom in rotation.

It will also be possible to provide several different arrangements for the disposition of these connection devices between the landing gear and the structure of the helicopter, in particular according to the dimensions and the mass of the latter.

For example, it will be possible to provide for the landing gear to comprise at least three devices for connection with the structure of the aircraft, one of them being attached centrally to one of the said cross-pieces and the other two being attached, whilst being mutually spaced with one on each side of the longitudinal axis of the landing gear, to the other cross-piece, or for it to comprise four devices for connection with the structure of the aircraft, two of them being attached to one and two to the other of the cross-pieces, and also being mutually spaced on either side of the longitudinal axis of the landing gear.

Also advantageously, it is possible to use a front or rear cross-piece having, between two sections of cross-piece, a gap in its central section, the said devices for connection with the structure of the aircraft then being attached as articulations with elastic return to the ends of the said sections.

According to yet another characteristic of the invention, the said rear cross-piece consists, for its front portion, of a bent tube having an aerodynamic profile forming a leading edge, this tube being extended towards the rear by an added fairing forming a trailing edge.

This arrangement will procure the double function of providing strength by a dimensioning giving the same stiffness as the reference tube, and an aerodynamic function relative to the stability of the helicopter. With regard to the added fairing, it will be possible for it not to participate in the strength of the cross-piece in flexion and it will be able to be fixed to the forward structural part by any appropriate means, such as screws, rivets or gluing.

The landing gear will also be able to comprise footboards attached to the said inclined transition zones at the front of the skids, below the access doors of the cabin, these footboards starting from the said transition zones and extending only towards the rear, which will allow any possible cable slip, rendering the utilization of a cable cutter in the lower parts of the helicopter useless.

BRIEF DESCRIPTION OF SEVERAL VIEWS OF THE DRAWINGS

Embodiments of the invention will now be described by way of example and in no way limitative with reference to the accompanying drawings in which:

FIG. 4a is a profile view of the front part of the landing gear, showing one of the curves of the tubular transition zone between the corresponding support stretch for standing on the ground and the front cross-piece;

FIG. 4b is a view along the line IV—IV of FIG. 4a, showing the other curve of the transition zone between the preceding one and the straight section of the cross-piece;

FIG. 5 is an axial cross-sectional view of a removable junction coupling piece for connecting two half-branches of a front cross-piece;

FIG. 6 is a cross-sectional view, in a plane perpendicular to the axis, of the connecting device with elastic return in rotation, making it possible to provide the link between the front cross-piece and the structure of the helicopter;

DETAILED DESCRIPTION OF THE INVENTION

Figure 1:
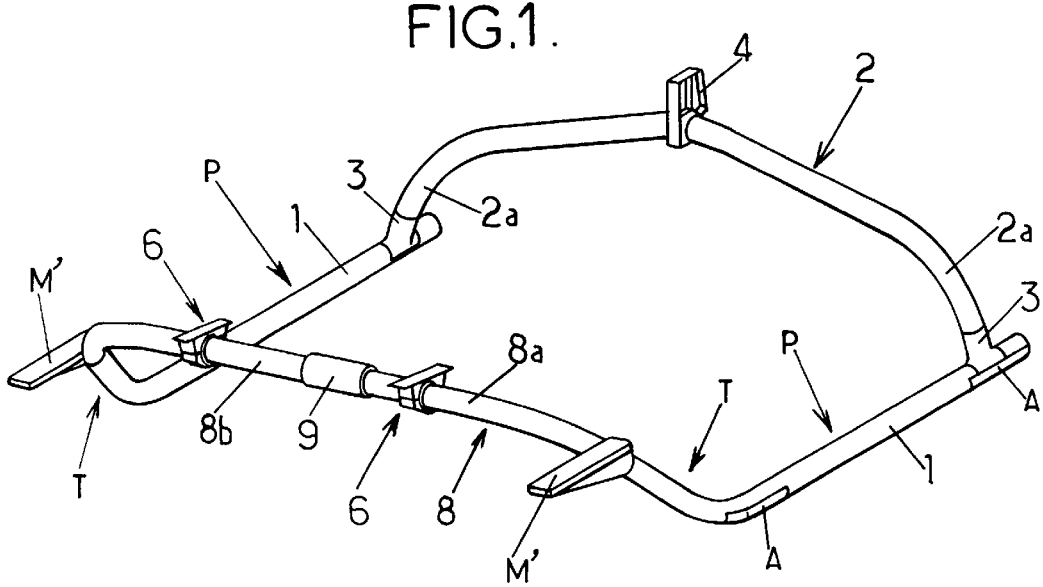
FIG. 1 is a perspective view of helicopter landing gear according to the invention.
Figure 3A:
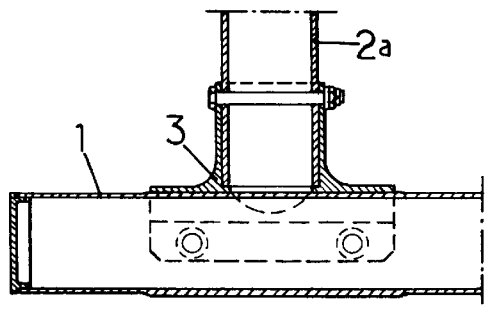
FIG. 3a is a view of the connecting coupling piece at the level of the ends of the descending branches of the rear cross-piece shown in cross-section through the axis of the corresponding longitudinal support stretch.
Figure 3B:
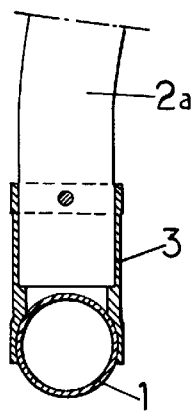
FIG. 3b is a view of a the coupling piece shown in cross-section perpendicular to this axis.
Figure 7:
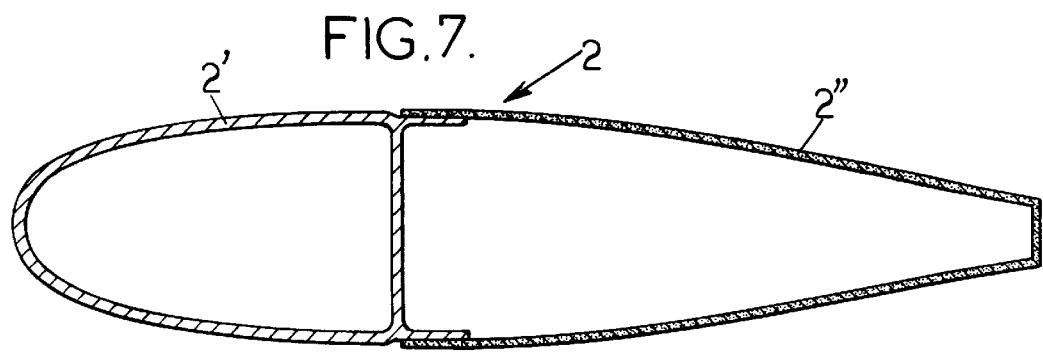
FIG. 7 is a transverse cross-sectional view of a rear cross-piece with an aerodynamic profile.

In FIG. 1, P is the general reference to the two skids of the landing gear, made entirely of aluminium tubes whose longitudinal support stretches for standing on the ground, in their straight section, are referenced 1. In their rear section, these support stretches 1 are connected to a rear cross-piece 2 by aluminium coupling pieces 3 fixed to the ends of the descending branches 2a of the cross-piece, these descending branches prolonging the central inclined section of the cross-piece 2 after bending in the vertical plane. The fixing coupling pieces 3 are better seen in FIGS. 3a and 3b. They are in the shape of a T whose rising stem is screwed to the branch 2a and whose horizontal branches are riveted to the corresponding support stretch 1 of the skid P, these fixing means of course being shown only by way of example.

Figure 2:
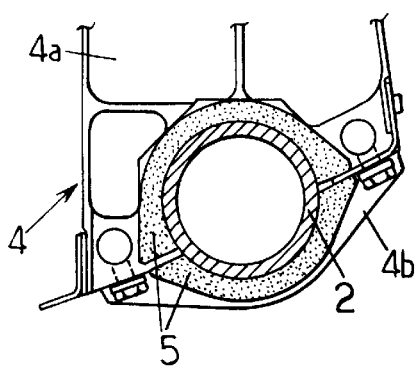
FIG. 2 shows a transverse cross-section of the connecting device with elastic return for connecting the rear cross-piece to the aircraft.

The rear cross-piece 2 can be attached to the strong structure S of the aircraft by a connecting device such as 4, shown in transverse cross-section in FIG. 2. This device consists of a frame 4a whose part straddling the tube of the cross-piece 2, and the recessed part of a screwed cover 4b are lined with an elastomer coating 5 making it possible to obtain a bearing with elastic return in rotation, with the advantages mentioned above with regard to the behaviour of the landing gear with respect to moments and other forces applied to the cross-piece 2 at the time of landing.

At the front, each of the skids P has, after the corresponding longitudinal support stretch 1, a transition zone T with double curvature before constituting the integrated front cross-piece 8. This transition zone T is obtained by a first bend C1 of radius R, bending the support stretch 1 upwards (FIG. 4a), and by a second bend C2, for example also of radius R, following the bend C1 and after which the actual front cross-piece 8 extends transversely.

Figure 9A:
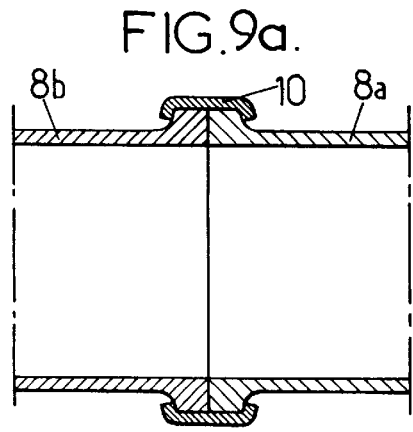
FIG. 9a shows, as a variant and in axial cross-section, a fixing collar which can also be used for producing the junction between the two half-branches of the front cross-piece, FIG. 9b being a transverse cross-sectional view of this coupling piece.
Figure 9B:
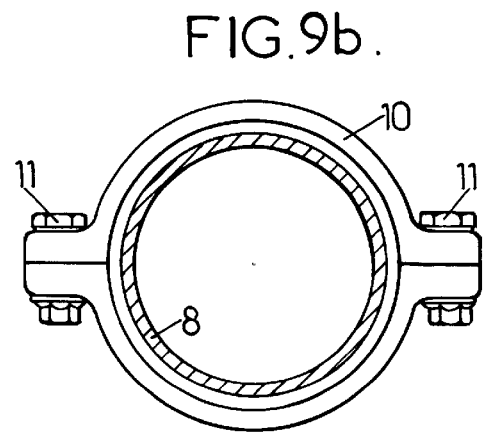

This integrated cross-piece can for example consist of two half-branches 8a, 8b of equal length and connected to one another consequently, in the middle of the cross-piece, by a removable junction means establishing the continuity of the cross-piece in flexion. This junction means can be embodied in various forms, for example by a rigid, strong, coupling piece system 9 made of aluminium, such as the one shown in FIG. 5 which can be fixed to the cross-piece 8 by screws. According to the variant shown in FIGS. 9a and 9b, this system could be replaced by a system with a fixing collar 10 held on the cross-piece by bolts 11 such that it remains removable.

If there is no requirement for removability, it is possible to place on the cross-piece 8, at the junction between the half-branches 8a and 8b, a glued coupling piece or even a welded attachment, using weldable aluminium for the tubes.

Figure 10:
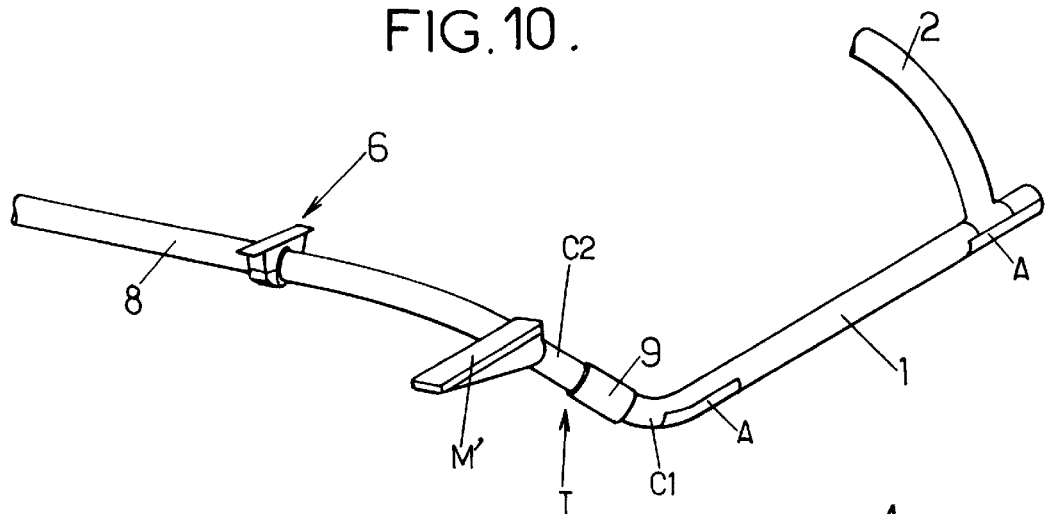
FIG. 10 is a partial perspective view of the front of the landing gear showing a variant for the positioning of the removable junction means between the front cross-piece and the front section of the corresponding skid.

As a variant, the front cross-piece 8 can consist of a single branch between the two transition zones T of the skids P, it then being provided with removable means 9 or 10 of attachment to the front part of the skid, for example between the two bent zones C1 and C2 of each corresponding transition zone T; this variant can be seen in FIG. 10 with a coupling piece 9.

With regard to the connection between the integrated front cross-piece 8 and the structure S of the helicopter, it will be possible for it to be provided by the same type of means as those used for the rear cross-piece 2. It will be possible to use connecting devices such as 6, having controlled friction in rotation, one of them being shown in transverse cross-section in FIG. 6. As for the devices 4, the frame 6a and the screwed cover 6b are internally lined with a coating of elastomer 7 providing the desired elasticity.

Figure 11A:
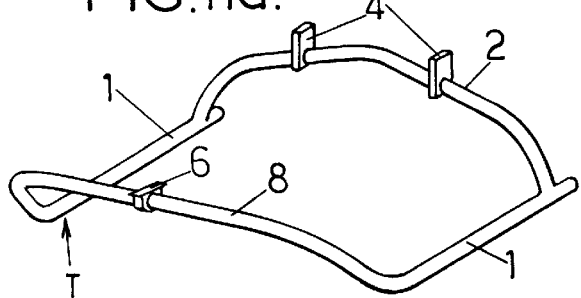
FIGS. 11a to 11d show several variants of the positioning of the devices for connecting between the front and rear cross-pieces and the structure of the aircraft.

In FIG. 1 there has been shown two connecting devices 6 between the integrated front cross-piece 8 and the structure S of the helicopter, and a single connecting device 4 between the rear cross-piece 2 and this structure, but the reverse disposition can of course also be envisaged, as shown in FIG. 11a where one connecting device 6 is used at the front and two connecting devices 4 at the rear. Two devices 4 at the rear and two devices 6 and the front can also be envisaged, as shown in FIG. 11b.

According to yet another variant, the integrated front cross-piece (FIG. 11c) or the rear cross-piece (FIG. 11d) has a central gap between two tubular cross-piece sections, referenced t for the front cross-piece and t' for the rear cross-piece. In this case, the connecting devices, 6 and 4 respectively, are attached to the ends of these sections, acting as articulations with elastic return in rotation, as in the other embodiments.

Figure 11E:
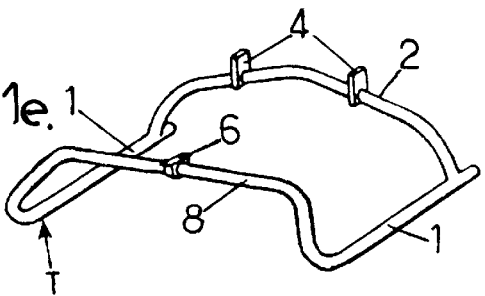
FIG. 11e shows the possibility of offsetting the integrated front cross-piece towards the rear.
Figure 11B:
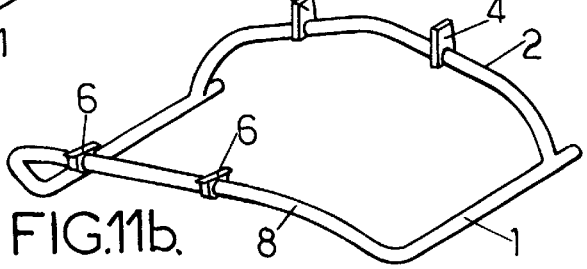
Figure 11C:
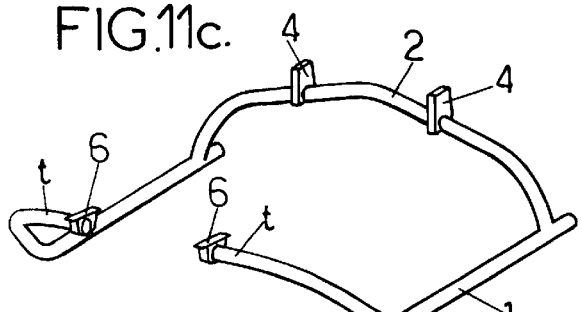
Figure 11D:
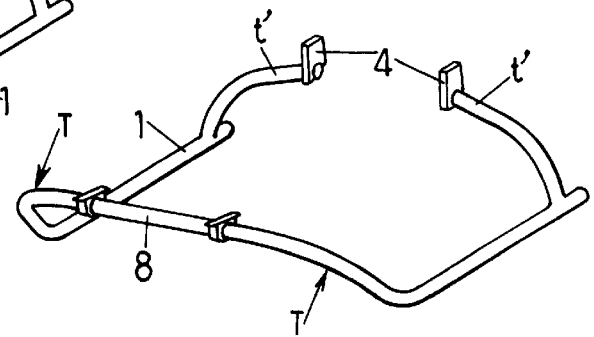

FIG. 11e is a variant of FIG. 11a, showing the possibility of offsetting the front cross-piece 8 towards the rear. Whereas in all of the other embodiments this cross-piece protrudes forwards, that is to say is offset forwards with respect to the front delimitation of the plane of contact of the longitudinal support stretches of the skids on the ground, in the embodiment shown in FIG. 11e this cross-piece 8 is set back, that is to say offset towards the rear with respect to the said front delimitation, which procures the specific advantages mentioned above.

Figure 8:
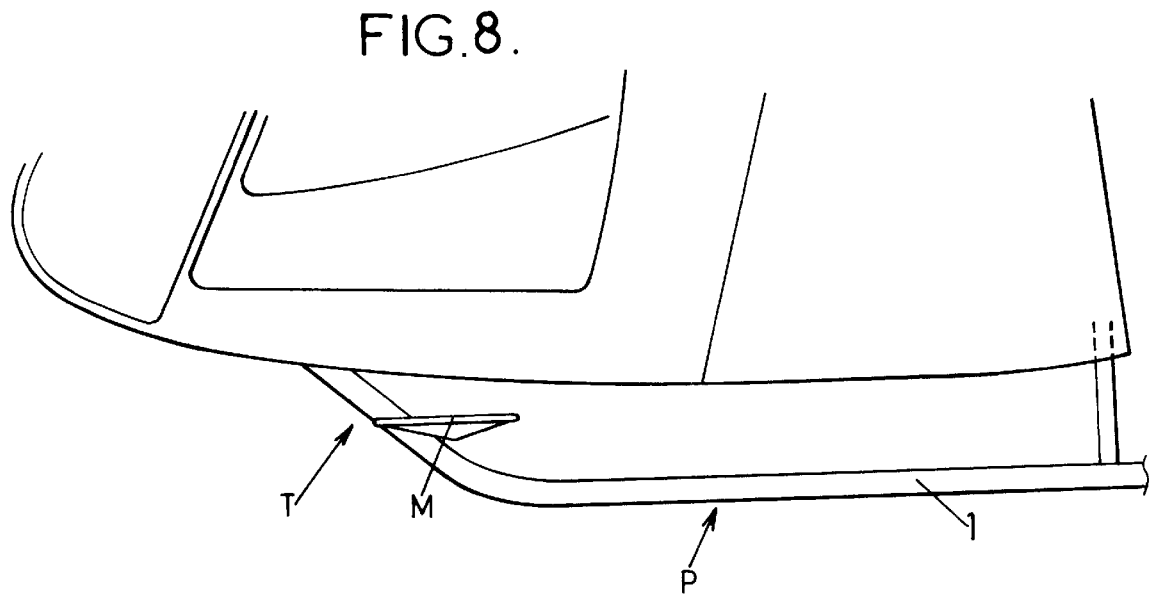
FIG. 8 is a partial profile view of the front part of a helicopter equipped with landing gear according to the invention, showing the arrangement of the footboards.

The invention also allows the use of the following additional arrangements:

the rear cross-piece 2 can, instead of consisting of a tube with a round cross-section, consist of two sections: a front tubular section 2' made of aluminium with an aerodynamic profile providing the same rigidity as the reference tube whilst improving the stability of the helicopter, and a fairing 2" added to the tube 2' and constituting the trailing edge of the cross-piece, this trailing edge being made for example from a material based on carbon, aramid, glass, or composite fibres;

footboards M' can be attached to the front cross-piece 8 below the access doors to the cabin, these footboards extending towards the front starting from the cross-piece, as shown in FIGS. 1 and 10. However, by displacing this cross-piece forwards, the footboards M can extend towards the rear starting from the cross-piece, as shown in FIG. 8, which makes it possible to avoid the use of cable cutters at the front under the helicopter;

finally, stainless steel wear plates A can be attached under the skids P (FIGS. 1 and 10) in order to reduce wear and friction. These plates can be attached to the skids P in a detachable manner, using connecting screws.

Figure 12:
FIG. 12 is a perspective view of the deformations of a conventional reference landing gear.
Figure 13:
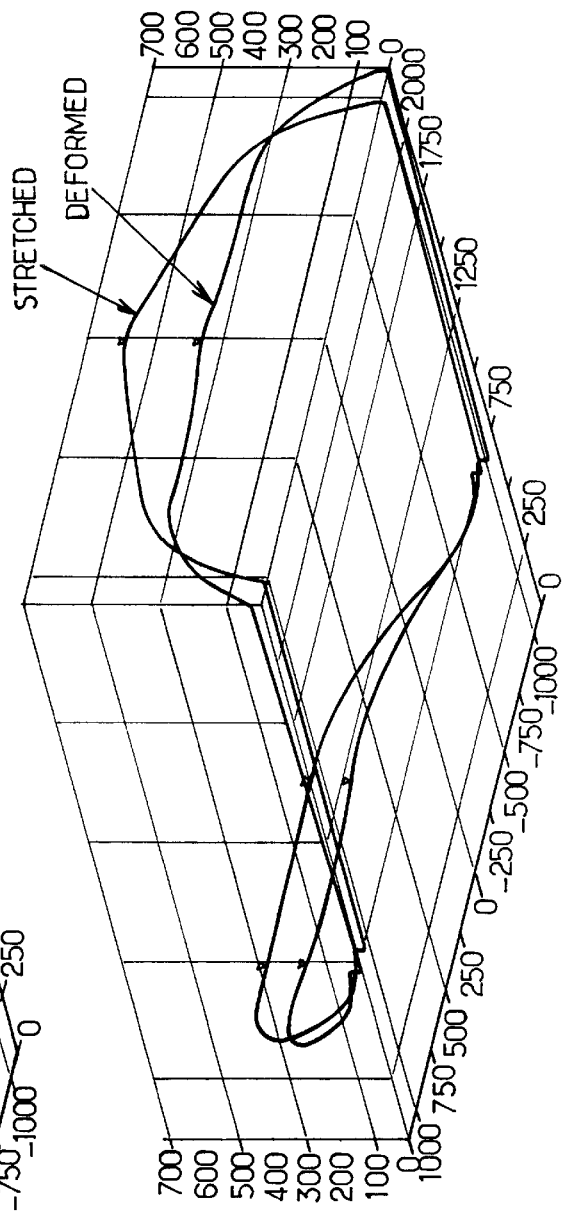
FIG. 13 shows, with the same scales, the deformations of landing gear according to the invention.

FIGS. 12 and 13 make it possible to compare the behaviour of landing gear with an integrated front cross-piece 8 according to the invention (FIG. 13) with that of conventional landing gear (FIG. 12) with a front cross-piece which is attached in the same way as the rear cross-piece.

It can be seen that, thanks to the special structure of the tube (wall thickness and strength characteristics determined by the finite elements method), the rear cross-piece 2 can undergo a much greater deformation than the rear cross-piece of conventional landing gear, which makes it possible to absorb landing shocks better. The same result is obtained at the front because of the deformation of the front cross-piece 8 in flexion and because of its rotation, allowed by the elastic flexion of the transition zones T.

What is claimed:

1. Helicopter landing gear, comprising a plurality of skids having a longitudinal support stretch for standing on ground and which are connected to a front cross-piece and a rear cross-piece for attachment to a structure of an aircraft by connecting devices, the rear cross-piece being fixed by ends of descending branches to a rear part of each said longitudinal support stretch, wherein each of said skids comprises a front comprising an inclined transition zone with double curvature oriented transversely with respect to each said longitudinal support stretch to form together an integrated front cross-piece offset with respect to a front delimitation of a plane of contact of each said longitudinal support stretch of each of said skids.

2. The helicopter landing gear according to claim 1, wherein said skids, said front cross-piece and said rear cross-piece comprise aluminum tubes.

3. The helicopter landing gear according to claim 2, wherein aluminum of said aluminum tubes comprises an elastic limit of about 75% of fracture strength and a relative elongation at fracture at least equal to about 12%.

4. The helicopter landing gear according to claim 2 wherein wall thickness of said aluminum tubes, said front cross-piece and said rear cross-piece is degressive between a central section of said front cross-piece and said rear cross-piece and a junction with a corresponding skid.

5. The helicopter landing gear according to claim 1, wherein an end of each of said descending branches of said rear cross-piece is fixed to one said longitudinal support stretch of one of said skids by an intermediary of aluminum coupling pieces.

6. The helicopter landing gear according to claim 1 wherein said front cross-piece comprises two half-branches interconnected by a removable junction means in a middle portion of said front cross-piece establishing continuity of said front cross-piece in flexion.

7. The helicopter landing gear according to claim 1, wherein said front cross-piece comprises a single branch comprising ends connected by a removable junction means to a front part of a corresponding skid, said junction means being disposed between two curves of a transition zone.

8. The helicopter landing gear according to claim 6 wherein said junction means comprises a member selected from the group consisting of a screwed coupling piece system of aluminum, and an attachment collar.

9. The helicopter landing gear according to claim 1, wherein said connecting devices between said front cross-piece and said rear cross-piece and the structure of the aircraft comprise two half-collars comprising an interposition of a bearing comprising elastic material for clamping said aluminum tubes.

10. The helicopter landing gear according to claim 1, comprising at least three devices for connection with the structure of the aircraft, wherein one of said devices is attached centrally to one member selected from the group consisting of said front cross-piece and said rear cross-piece, and at least another of said devices is attached, while being mutually spaced on each side of a longitudinal axis of the landing gear, to another member selected from the group consisting of said front cross-piece and said rear cross-piece.

11. The helicopter landing gear according to claim 1, comprising four devices for connection with the structure of the aircraft, wherein two of said devices are attached to one member selected from the group consisting of said front cross-piece and said rear cross-piece and two of said devices are attached to another member selected from the group consisting of said front cross-piece and said rear cross-piece, and mutually spaced on either side of a longitudinal axis of the landing gear.

12. The helicopter landing gear according to claim 11, wherein at least one member selected from the group consisting of said front cross-piece and said rear cross-piece, comprises a gap in a central section, and wherein said devices for connection with the structure of the aircraft are attached as articulations with elastic return to ends of sections of said front cross-piece and said rear cross-piece.

13. The helicopter landing gear according to claim 1, wherein said rear cross-piece comprises a bent tube having an aerodynamic profile forming a leading edge, said tube extending rearwardly by a faring forming a trailing edge.

14. The helicopter landing gear according to claim 1, wherein foot boards are attached to each said inclined transition zone at a front of each of said skids, below access doors of a cabin of the aircraft, said foot boards starting from each said inclined transition zone and extending rearwardly.

15. The helicopter landing gear according to claim 1 wherein said front cross-piece is offset forwards with respect to a front delimitation of a plane of contact of each said longitudinal support stretch of each of said skids on the ground.

16. The helicopter landing gear according to claim 1, wherein said front cross piece is offset backwards with respect to a front delimitation of a plane of contact of each said longitudinal support stretch of each of said skids on the ground.

* * * * *